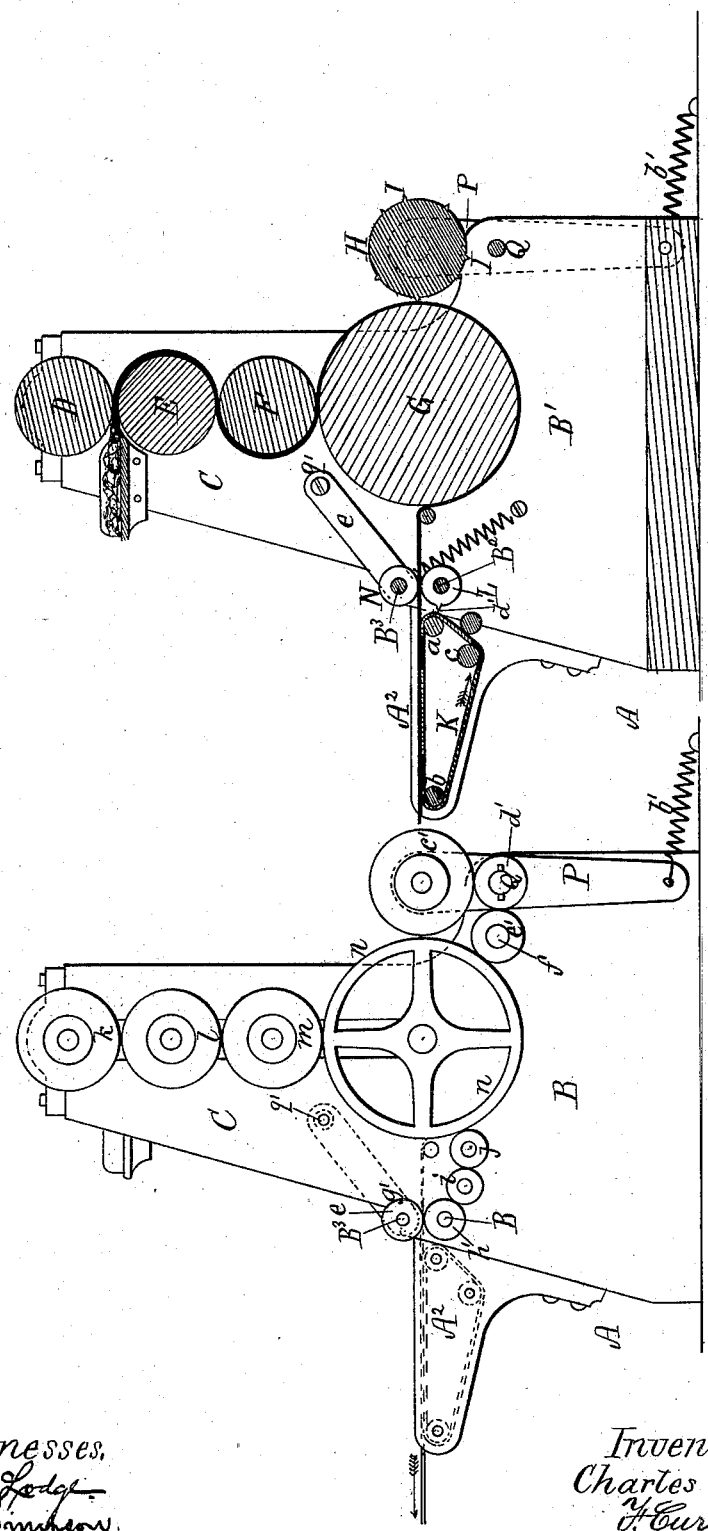

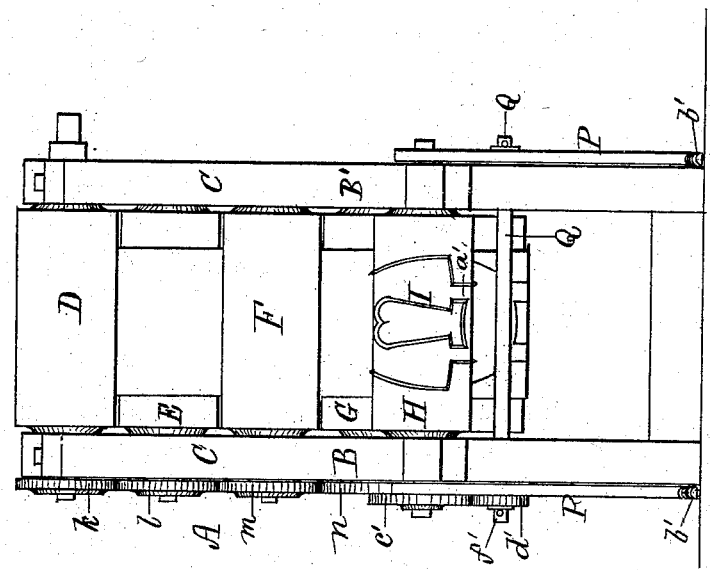
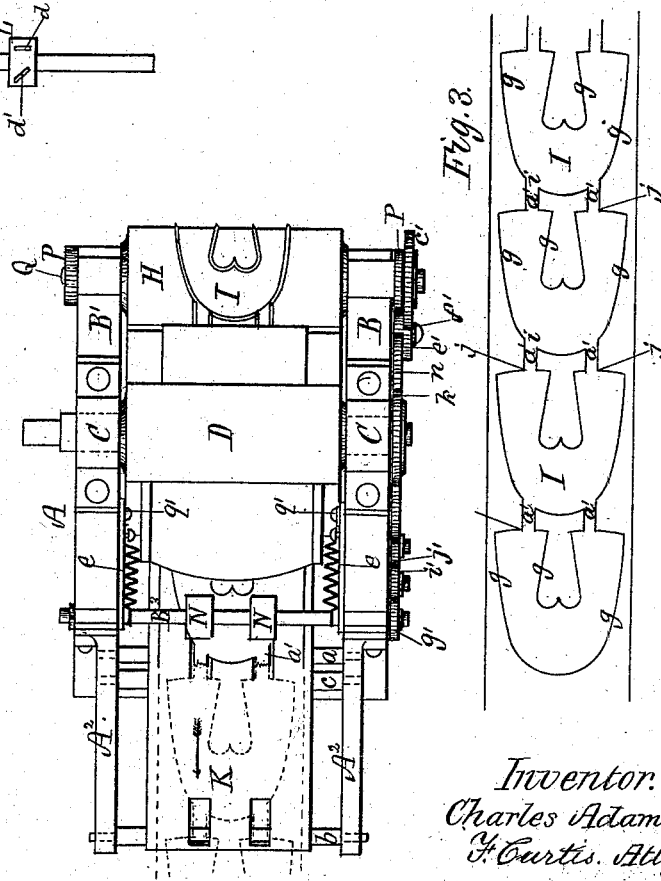

UNITED STATES PATENT OFFICE.

CHARLES ADAMS, OF BROOKLYN, NEW YORK.

RUBBER-CUTTING MACHINE.

SPECIFICATION forming part of Letters Patent No. 257,632, dated May 9, 1882.

Application filed October 29, 1881. (No model.)

*To all whom it may concern:*

Be it known that I, CHARLES ADAMS, a subject of Great Britain, residing at Brooklyn, in the county of Kings and State of New York, have invented certain new and useful Improvements in Rubber-Cutting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The purpose of this invention is to cut boot and shoe uppers or other articles from a sheet or band of india-rubber at one continuous operation, the articles being finally discharged from the machine in a state to require no further cutting or trimming before applying them to use.

My invention consists, first, in the manner of connecting the series of uppers together by strips after being cut into their general shape by the shaping-dies; second, in severing these connecting-strips by a subsequent function of the machine and at the same operation, and, thirdly, in the physical structure of the machine and the peculiar construction of some of its details.

The drawings accompanying this specification represent, in Figure 1, a vertical and longitudinal section, and in Fig. 2 a side elevation, of a machine containing my invention. Fig. 3 is a diagram showing the method of cutting boot and shoe uppers from a sheet of material. Fig. 4 is a plan, and Fig. 5 a front elevation, of the machine. Fig. 3 represents also a plan of the stripping-knives and their cylinder developed upon a flat plane.

In the above-named drawings the frame of the machine is shown at A as composed of upright side standards or housings, B B', united by suitable cross-ties, while the central portions of these housings extend upward, as shown at C C, to furnish a support for the rolls which produce the sheet of prepared material from the crude rubber or pulp. These latter-named rolls are in the present instance four in number, as shown at D E F G, and arranged in horizontal parallelism, and their journals are supported in a suitable manner in the uprights C C to permit of vertical play of the rolls to adapt or adjust them to sheets of varying thickness.

H is a horizontal roll, disposed at the extreme front part of the machine, in front of and parallel with the roll or drum G, said roll H being journaled in vibratory adjustable supports, as hereinafter explained, and carrying upon its periphery the die or line of connecting dies which operate with the periphery of the drum G to cut a series of boot or shoe uppers or other objects from the sheet or web of rubber issuing from between the rolls F G and passing about the latter, which constitutes a cutting-bed.

The cutting-die or line of continuous dies above named are shown at I I, &c., as of the shape in the present instance to cut a series of boot-uppers, said dies being preferably secured to or formed upon the outer periphery of a sleeve which encompasses said roll H, in order that the knives may be readily removed from the roll, when desired, for the purpose of repairing or renewing them. The dies I may be in single connecting lines peripherally of the roll H, as shown; or they may be in two or more parallel lines, according to the desired capacity of the machine; but as far as my experiments have gone I prefer a single line.

K in the drawings represents an endless apron, caused by suitable mechanism to travel about a series, *a b c*, &c., of horizontal parallel guide-rolls journaled within suitable supporting-brackets, A² A², secured to the rear of the housings B B', the foremost one—viz., *a*—of these rolls being closely adjacent to the roll or drum G. The apron K is intended to convey to the secondary or trimming knives the band of connecting uppers cut by the knives or dies I, as well as to carry off the margins of the band left at each side of said line of uppers. This apron may in some instances, perhaps, be dispensed with, if the rubber band is of sufficient strength to travel alone; but I prefer in all cases to retain it.

As my machine is adapted to permit the trimmings or scraps cut from the uppers in disconnecting the latter by the action of the secondary knives to fall into a receptacle upon the floor of the apartment or upon an elevator, which shall receive and return them to the forming-rolls D E to be re-formed into a new sheet or web, it is necessary that openings be created in the traveling apron to permit of descent through it from it of said scraps; and to this end I prefer that said apron shall be composed of a number of parallel bands, the spaces intervening between which serve to permit of escape of these scraps; or a single apron may be employed having a series of openings for the purpose, as shown in Figs. 1 and 4 of the drawings.

In rear of the roll $a$ or the drum G, I dispose upon a horizontal parallel shaft, $B^2$, a pair, L L, of circular cylinders or hubs, which constitute knife-stocks, the peripheries of which are armed each with a pair of radial knives or cutters, $d\ d'$. These cutters $d\ d'$ are so disposed upon the hubs L L with relation to the positions of the dies I of the roll H that one of each pair of said cutters $d\ d'$—viz., $d$—as herein explained, severs a connecting-strip, $a'$, at its point of junction with the heel portion of the upper, as at $j$, while the cutters $d'$ sever such strips at the point of intersection with the toe portion of the upper, as shown at $i$. Owing to the action of these cutters $d\ d'$ each boot-upper or other object cut by the knives I leaves the machine in a complete state, ready for use without further trimming or finishing, while the margins of the rubber band continue on intact and leave the apron at its rear end, the said uppers being picked from the apron or allowed to continue with and be discharged from the end of the latter. The strips $a'$, severed, as stated, fall through the openings in the apron into a receptacle below, or into a suitable elevator, which returns them to the rolls D E.

N N in the drawings represent disks or rolls mounted upon a shaft, $B^3$, journaled in the lower or rear ends of sloping arms $e\ e$, which are pivoted at their upper or front ends to the inside of the housings B B', as shown at $q'$, the rolls N N serving, when in their lowest position, as a shifting cutter bed or block to the knives $d\ d'$ to sever between them the strips of material which connect the series of uppers cut by the dies I I, &c. The die or cutter I is, for illustration, shown in the present instance as adapted to cut a series of boot-uppers, and for this purpose one of the formers shown in Fig. 3 of the accompanying drawings, and as before stated, may be arranged in a single line or in pairs side by side longitudinally of the roll H, or in triplets or greater numbers, if desired, while the number of these cutters peripherally of the said roll are to be determined by practice or circumstances or the diameter of said roll.

It will be seen on examining the diagram, Fig. 3, that the outline of each die I is shown by the line $g\ g\ g$, &c., which is the contour of the upper or other object to be cut, and said diagram represents a series of uppers cut from a sheet of rubber in a continuous line. The toe portion of each upper, as the band of rubber passes the cutter-roll H and is cut into a series of uppers, as stated, connects with the heel portion of the upper next in advance of it by narrow integral strips $a'\ a'$, which are subsequently severed by the knives $d$; but these connecting-strips may be different in locations from the precise arrangement shown in the drawings. The margins or sides of the original band of material from which the series of uppers are cut remain intact and may be returned to the rolls D E, and there join the mass introduced between such rolls, to be reincorporated in a fresh band of material.

Upon the adjacent journals of the rolls D E F G spur-gears or friction-wheels $k\ l\ m\ n$ are respectively secured, and by which the series of rolls are put in rotation, the gear of the roll E, in this instance, being the driver. The cutter-roll H is journaled at each end within the upper end of an upright vibratory bar, P, which is pivoted at its upper part upon the outside of the adjacent housings B by a horizontal rod, Q, which spans the said housings B B, the said roll H being crowded up to the roll or drum G with a yielding or elastic pressure by the action of coiled springs $b'\ b'$, one of which is secured to the lower end of each bar P and to the base of the machine. This manner of mounting the cutter-roll H adapts it to sheets of material of varying thickness.

To impart the necessary rotations to the roll H, I affix to one of its journals a spur-gear or friction-wheels, C', which engage a pinion or friction-wheels, $d'$, pivoted to one end of the rod Q, and this pinion $d'$ in turn engages a second pinion or wheel, $e'$, pivoted by a stud, $f'$, to the side of the housing B, said pinion $e'$ also engaging the gear $n$, secured to the journal of the roll or drum G.

The rolls L and N are put in rotation as follows: To one journal of the upper or adjustable roll, N, is affixed a pinion or friction-wheel, $g'$, which meshes with a pinion, $h'$, secured to the adjacent journal of the roll or cylinder L, while the last-named pinion $h'$ engages with the gear $n$ (before named as secured to the journal of the drum G) by two intermediates, $i'\ j'$, which are pivoted to the sides of the housing B. The apron K travels in the direction of its arrows.

The operation of this machine is as follows: The crude rubber or pulp is introduced between the rolls D E and passes between them, and the series of rolls D, E, and G being by the act reduced to a sheet, $q'$, of uniform thickness, which is led from the surface of the roll G to and upon the apron K and between the knife-cylinder L and roll N, the series of uppers, after being severed by the knives $d$, being carried to the end of the apron and precipitated into a suitable receptacle. As the sheet of rubber passes between the roll or drum G and die-roll H the dies I cut from such sheet two parallel rows of uppers, which are united longitudinally by the strips $a'\ a'$, before named, these strips being subsequently severed by the knives $d$, as stated, and allowed to drop through and below the apron K, while the continuous margins of the sheet of rubber continue on to the end of the apron to be properly disposed of.

Though I have in the present instance shown and explained my machine as adapted to cut boot and shoe uppers, it is obvious that the dies I may be of a form to cut various objects of other shapes, and in this respect I do not confine myself to the form of the objects cut.

I claim—

1. In machinery for cutting sheets of rubber or other analogous elastic tenacious material into boot uppers or other objects, the combination, with suitable feed-rolls, of two sets of revolving knives, operating one to cut the major portions of the said uppers or other objects and leave them connected by slight strips, and the other to subsequently sever such strips, leaving the uppers or other objects complete, substantially as explained.

2. In machinery for cutting a sheet of rubber or other analogous elastic tenacious material into boot-uppers or various other objects, the combination, with a shifting bearing or cutting cylinder or bed, of a revolving cylinder armed upon its periphery with a series of cutters of such form and operating with said bed in such manner as to cut from the sheet passing through between them a series of boot-uppers or other objects which are connected by frail strips, by which strips said uppers, after being cut, are fed along together from the knives and bed, substantially as described.

3. In machinery for cutting a sheet of rubber or other analogous elastic tenacious material into boot-uppers or various other objects, the combination, with a suitable cutting-bed, of a series of cutters mounted upon a rotary cylinder, and of a shape to cut a boot or shoe upper entire from a sheet of rubber or other analogous material, with the exception of frail strips which connect said uppers, substantially as stated.

4. The drum G, operating with the cutter I as a shifting bed to such cutters, and as a means of feeding the sheet of material along, substantially when such cutters are of a form to cut from said strip a continuous line of uppers or other objects connected by slight strips, substantially as described.

5. The cutter I, of a shape to cut from a sheet of rubber or other material a series of boot-uppers or other objects united by frail connections, substantially as and for the purposes stated.

6. The endless apron K, in combination with the drum G, cutter I, and knives or cutters d d', substantially as described.

7. In combination with the rotary drum G, the cutter-cylinder or roll H, connected adjustably to the machine-frame with respect to the said drum to automatically adapt itself to varying thickness of material passing between said drum and cylinder, substantially as stated.

8. In combination with the drum G and the cutters I I, the knives or cutters d d', suitably supported, and operating to sever the strips connecting the uppers or other objects cut by the said cutter I, substantially as and for the purposes set forth.

9. The combination, with the cutter I, the drum G, and the knife-stocks L, of the rotary rolls or hubs N, as connected adjustably with said stocks to constitute shifting cutter-beds for the latter, substantially as set forth.

10. In combination with the cutters I, drum G, and knives d d', the endless aprons K, having openings to permit of escape of the scraps cut from the material by the said knives d d', substantially as herein set forth.

11. The general physical structure of the machine as composed of the housings B B', rolls D E F, drum G, cylinder or roll H, with its cutters I, and adjustable automatically with respect to the drum G, the knives d d', mounted upon rotary cylinders and operating with the rotary beds or hubs N, and the endless apron, with its openings, substantially as described.

In testimony whereof I affix my signature in presence of two witnesses.

CHARLES ADAMS.

Witnesses:
H. E. LODGE,
F. CURTIS.